United States Patent
Schibel et al.

(10) Patent No.: US 11,558,989 B2
(45) Date of Patent: Jan. 24, 2023

(54) THREE-POINT HITCH FOR AN AGRICULTURAL MACHINE

(71) Applicant: DEERE & COMPANY, Moline, IL (US)

(72) Inventors: Achim Schibel, Heidelberg (DE); Werner Zahn, Altlußheim (DE)

(73) Assignee: DEERE & COMPANY, Moline, IL (US)

( * ) Notice: Subject to any disclaimer, the term of this patent is extended or adjusted under 35 U.S.C. 154(b) by 773 days.

(21) Appl. No.: 16/395,324

(22) Filed: Apr. 26, 2019

(65) Prior Publication Data

US 2019/0327877 A1    Oct. 31, 2019

(30) Foreign Application Priority Data

Apr. 27, 2018 (DE) .......................... 102018206628.0

(51) Int. Cl.
*A01B 59/043* (2006.01)
*A01B 59/00* (2006.01)

(52) U.S. Cl.
CPC .......... *A01B 59/043* (2013.01); *A01B 59/002* (2013.01)

(58) Field of Classification Search
CPC ... A01B 59/043; A01B 59/002; A01B 59/066; B60D 1/141
USPC ........................................................ 172/439
See application file for complete search history.

(56) References Cited

U.S. PATENT DOCUMENTS

| | | | | |
|---|---|---|---|---|
| 237,812 A | * | 2/1881 | Cameron | A01B 15/08 172/718 |
| 375,647 A | * | 12/1887 | McHatton | A01B 35/02 172/359 |
| 472,015 A | * | 3/1892 | Fariss | A01B 3/08 172/366 |
| 3,110,509 A | * | 11/1963 | Schlichting et al. | A01B 59/002 403/61 |

(Continued)

FOREIGN PATENT DOCUMENTS

| | | |
|---|---|---|
| CN | 104135844 A | 11/2014 |
| EP | 2556736 A1 | 2/2013 |

(Continued)

OTHER PUBLICATIONS

European Search Report issued in counterpart application No. 19169172.4 dated Sep. 25, 2019. (20 pages).

*Primary Examiner* — Thomas B Will
*Assistant Examiner* — Joel F. Mitchell
(74) *Attorney, Agent, or Firm* — Taft Stettinius & Hollister LLP; Stephen F. Rost

(57) ABSTRACT

A three-point hitch for an agricultural tractor includes a lift arm, a lower link arm, and a lift spindle disposed between the lift arm and link arm for transmitting a pivoting movement performed on the lift arm to the link arm. The lift spindle includes a first fastening section on the lift arm and a second fastening section on the link arm. An elongated hole is formed in the second fastening section along a longitudinal direction of the lift spindle, and a mounting pin extends through a fastening opening in the link arm and is mounted in the elongated hole. At least two spaced apart locking regions are formed along the elongated hole for receiving a shaped feature on the mounting pin. A movement (Continued)

of the link arm along the elongated hole is blocked when the shaped feature is received in one of the locking regions.

19 Claims, 2 Drawing Sheets

(56) References Cited

U.S. PATENT DOCUMENTS

| | | | | |
|---|---|---|---|---|
| 7,861,794 B2 * | 1/2011 | Tarasinski et al. | .. | A01B 59/068 |
| | | | | 172/439 |
| 10,730,357 B2 * | 8/2020 | Heimbuch | ............... | B60D 1/42 |

FOREIGN PATENT DOCUMENTS

| | | | |
|---|---|---|---|
| EP | 2671440 A1 | 12/2013 | |
| GB | 1134356 A | 11/1968 | |

\* cited by examiner

THREE-POINT HITCH FOR AN AGRICULTURAL MACHINE

RELATED APPLICATIONS

This application claims priority to German Patent Application Ser. No. 102018206628.0, filed Apr. 27, 2018, the disclosure of which is hereby incorporated by reference in its entirety.

FIELD OF THE DISCLOSURE

The present disclosure relates to a three-point hitch for an agricultural machine such as a tractor, and in particular to a three-point hitch having a lift arm, a lower link arm, and a lift spindle disposed therebetween for transmitting a pivoting movement performed on the lift arm to the lower link arm.

BACKGROUND

A conventional three-point hitch in a rear region of an agricultural machine (e.g., tractor) usually includes a hydraulically actuatable lift mechanism with left and right lift arms that can be pivoted by means of associated hydraulic cylinders. The conventional hitch includes left and right lower link arms, which are pivotably mounted at lower articulation points of the three-point hitch and are movably connected to the lift arms via longitudinally adjustable lift spindles. Furthermore, there is a central upper link, which is pivotably suspended at an upper articulation point of the three-point hitch. Both the lower link arms and the upper link arm have coupling hooks for receiving complementary fastening elements of an implement to be attached to the three-point hitch. Each of the lower link arms is fastened by a removable mounting pin in an elongated hole of a respective lift spindle, the elongated hole providing a vertical degree of freedom of movement, and thus the realization of a floating position. This is necessary in the operation of certain ground-engaging implements to compensate for variations in the ground that arise during the working of a field. In addition, the lower link arm is fixed in a lower position within the elongated hole by the mounting pin.

Between the two lower link arms there is also a traction jaw or a comparable coupling device for attaching a trailer drawbar for towed accessories, thus, for example, a trailer, hay truck, or the like. When performing transport journeys, the greatest possible lateral clearance between the drawbar and the lower link arms is desired to reduce the turning radius during maneuvering. In this case, the lower link arms are brought into a raised position as far as possible by the hydraulic lift mechanism.

There is a need, however, for a three-point hitch which allows an additional increase of lateral clearance of a drawbar running between the lower link arms.

SUMMARY

In the present disclosure, a three-point hitch for an agricultural tractor may include a lift arm, a lower link arm, and a lift spindle disposed therebetween for transmitting a pivoting movement carried out on the lift arm to the lower link arm. The lift spindle has a first fastening section articulated on the lift arm and a second fastening section articulated on the lower link arm. In addition, an elongated hole may run in a longitudinal direction of the lift spindle and is formed in the second fastening section. A mounting pin extends through a fastening opening of the lower link arm being mounted in the elongated hole. In this case, at least two locking regions, which are spaced apart from one another, are formed along the elongated hole for positively receiving a shaped feature provided on the mounting pin. A movement of the lower link arm along the elongated hole may be blocked in each case in the event that the mounting pin is received by one of the locking regions by means of the shaped feature.

The locking regions lying one above the other in the installed state of the lift spindle make it possible to fix the lower link arm both in a lower position or an operating position, and also in an upper position or a transport position by means of the mounting pin. Ideally, the two locking regions are assigned to the opposite ends of the elongated hole, so that the lower link arm can be lifted further upward by means of the hydraulic lift mechanism corresponding to the length of the elongated hole, if the latter is fixed in the upper position by means of the mounting pin. This leads to an additional increase in the lateral clearance of the lower link arms relative to a drawbar running between them.

The shaped feature can be brought into a floating position, releasing the lower link arms along the elongated hole by reversing the mounting pin. This makes it possible for a ground-engaging implement attached to the three-point hitch such as, for example, a harrow, a cultivator or the like, to follow a ground contour to be worked within the limits set by the elongated hole.

In this case, there is the possibility that left and right cheeks run along the elongated hole, the shaped feature being guided between the two cheeks in the floating position. For this purpose, the shaped feature is disengaged from the respective arresting region by shifting the mounting pin into the floating position. It is further possible for the shaped feature to move freely back and forth in the floating position along the guide region bounded by the two cheeks.

It is also conceivable for the locking regions in the two cheeks to be formed in the form of cutouts complementary to an outer contour of the shaped feature. The outer contour of the shaped feature projecting into the cutouts of the cheeks blocks a movement of the mounting pin and thus of the lower link arm along the elongated hole.

In the simplest case, the shaped feature is a rectangular plate arranged on the end face of the mounting pin. The mounting pin, including the rectangular plate, is typically made of galvanized steel. The rectangular plate can be designed or dimensioned in such a way that it forms an overload safety device for protecting the upper locking region on the lift spindle in the event that the lower link arm is fixed in the upper position by means of the mounting pin. If, in this state, an implement is suspended in the lower link arm and lifted by means of the hydraulic lift mechanism, this leads to the rectangular plate being bent out of the locking region, with release of the lower link arm due to the overload. Under the action of the implement load, the lower link arm is pivoted in the direction of its lower position until the mounting pin comes into contact with the lower end of the elongated hole and the lower link arm assumes a stable state. The destroyed mounting pin can be replaced comparatively inexpensively.

The rectangular plate can be permanently attached to the mounting pin, forming a T-pin. For this purpose, the rectangular plate is welded at the end face to a pin base enclosed by the mounting pin or forms a one-piece forged part with the latter. Deviating from this, it is also conceivable that the rectangular plate is separably attached to the mounting pin or its pin base by hand and can be fixed there by means of a linchpin or the like. In view of the overload situation described above, this allows only the bent rectangular plate to be replaced without having to replace the entire mounting pin.

For a visual status check, the at least two locking regions can be oriented differently, these running in particular at an angle of approximately 45° relative to one another. In the case that the shaped feature is formed as a square washer, it is immediately apparent to an operator due to the resulting characteristic angular position whether or not the lower link is fixed precisely in the load-free upper position to be operated.

For reasons of robustness, it makes sense for the second fastening section to have two fork segments surrounding the lower link arm, the at least two locking regions being provided in the same way on each of the two fork segments. In this case, the mounting pin has corresponding shaped features on both sides. If the shaped features are designed as rectangular plates, they can be disposed opposite one another on the mounting pin, one being permanently attached to the pin base and the other being separably attached to the pin base.

Moreover, the elongated hole (from center to center) may have a length of approximately 80 mm in order to provide sufficient lateral clearance for a drawbar extending between the lower links located in the upper position. Depending on the specific circumstances, however, a different length can also be selected.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
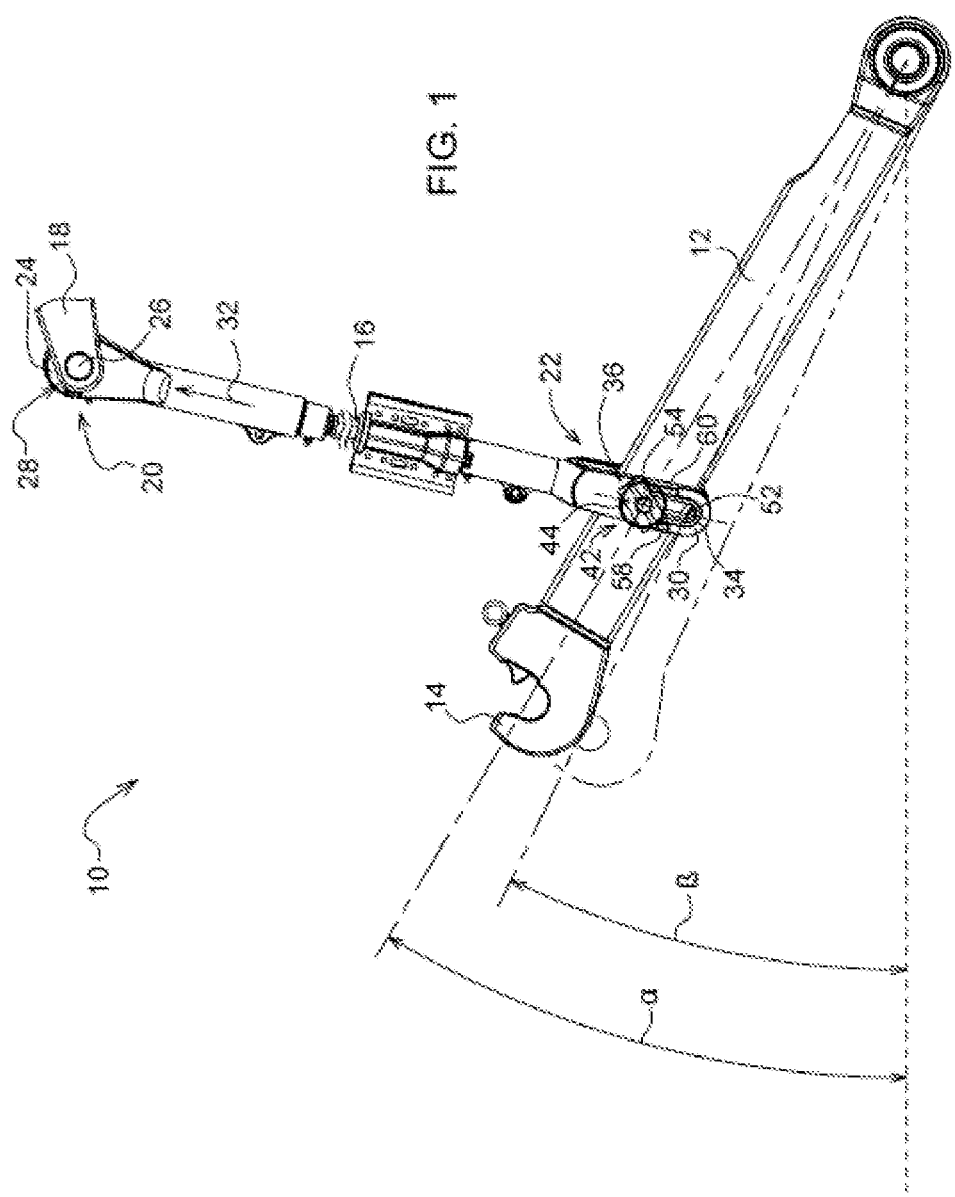
FIG. 1 shows a detail of one embodiment of a three-point hitch for an agricultural machine.

FIG. 1 shows a section of one embodiment of a three-point hitch according to the present disclosure in a sectional representation, this being explained below with reference to the detailed view in FIG. 2. For reasons of clarity, only the components of the three-point hitch that are essential to present disclosure are shown. This also applies to a towing coupling located between associated lower link arms or a comparable coupling device, to which a trailer drawbar of towed accessories, that is to say, for example, a trailer, a hay truck or the like, can be attached.

The three-point hitch 10 comprises left and right lower link arms, of which only a single lower link arm 12 with a coupling hook 14 for receiving a complementary fastening element of an implement to be attached to the three-point hitch 10 are shown. The implement is connected to an associated lift arm 18 by means of a length-adjustable lift spindle 16 so that a pivoting movement performed on the lift arm 18 by a hydraulic lift mechanism can be transmitted to the lower link arm 12.

More precisely, the lift spindle 16 has a first fastening section 20 articulated on the lift arm 18 and a second fastening section 22 articulated on the lower link arm 12. The first fastening section 20 is a fastening eye 24 that is mounted by means of a hinge pin 26 in a fork-shaped end region 28 of the lift arm 18, whereas the second fastening section 22 has two fork segments 30 embracing the lower link arm 12. Formed in each of the fork segments 30 is an elongated hole 34 that extends in the longitudinal direction 32 of the lift spindle 16 and in which a mounting pin 36 extending through a fastening opening of the lower link arm 12 is mounted (see FIG. 2).

Along the respective elongated hole 34, two locking regions 38, 40, which are spaced apart from one another, are formed for the form-fitting reception of shaped features 42 provided on both sides of the mounting pin 36. Each of the shaped features 42 is a rectangular plate 44, 46, which is disposed on the end face of the mounting pin 36. One rectangular plate 44 is permanently attached to the mounting pin 36 to form a T-pin, for which purpose the latter is welded at the end face to a pin base 48 encompassed by the mounting pin 36 or forms a one-piece forged part with the latter. The other rectangular plate 46 is separably mounted by hand on the mounting pin 36 or its pin base 48 and fixed there by a linchpin 50. The mounting pin 36, including the two rectangular plates 44, 46, is made of galvanized steel.

Figure 2:
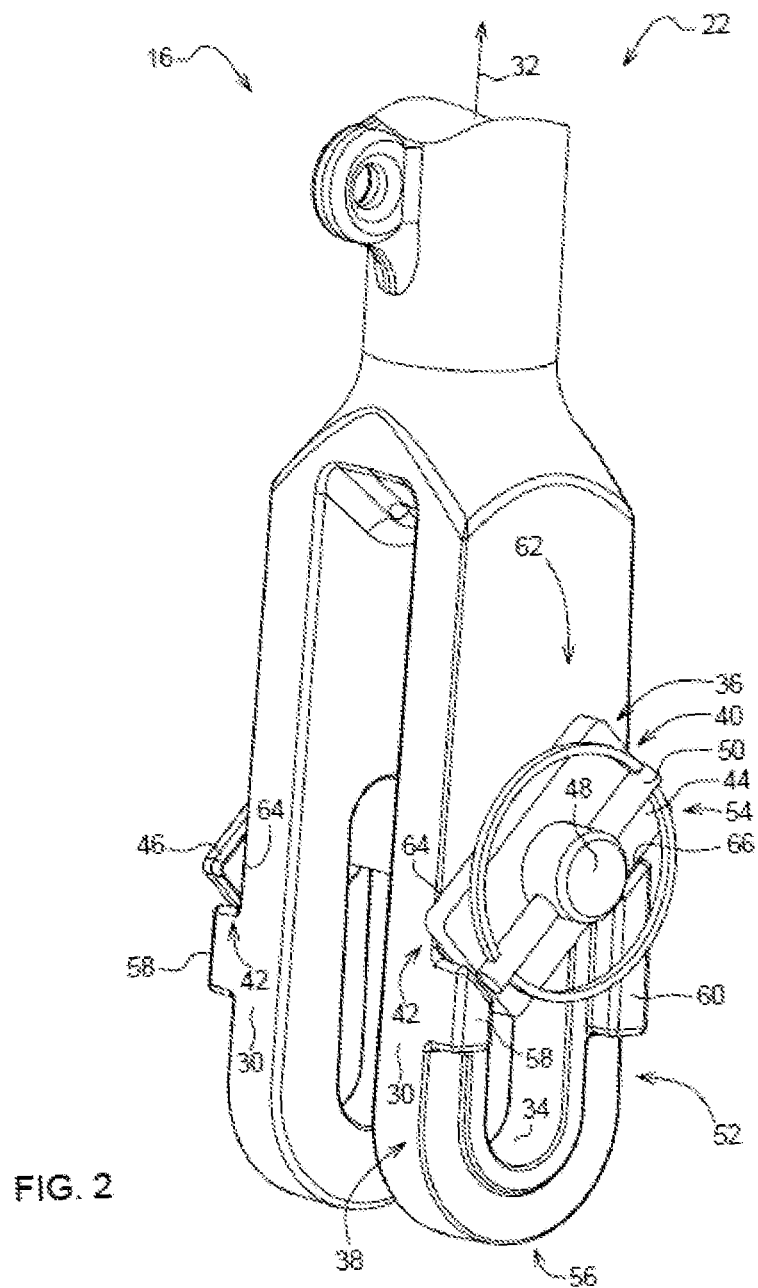
FIG. 2 shows a detailed perspective view of the three-point hitch shown in FIG. 1.

As shown in FIG. 2, the locking regions 38, 40 lying one above the other permit the lower link arm 12 to be fixed by means of the mounting pin 36 both in a lower, or operating, position 52 and also in an upper, or transport, position 54. For example, the two locking regions 38, 40 are assigned to the opposite ends of the elongated hole 34 so that, if the lower link arm 12 is fixed in the transport position 54 by means of the mounting pin 36, the link arm can be raised further up the length of the elongated hole 34 by the hydraulic lift mechanism. This is illustrated in FIG. 1 by the two maximum pivot angles α and β, where α>β. In this example, the elongated hole 34 has a length (center to center) of about 80 mm.

In addition, the rectangular plates 44, 46 can be brought into a floating position 56, which releases the lower link arm 12, by reversing the mounting pin 36. For this purpose, the linchpin 50 is first released, the loose rectangular plate 46 is removed, and the mounting pin 36 is pulled out of the elongated hole 34. The mounting pin 36 is then repositioned in the floating position 56 in the reverse order. The floating position 56 permits a ground-engaging implement attached to the three-point hitch 10 such as, for example, a harrow, a cultivator, or the like, to follow a ground contour to be worked within the limits set by the elongated hole 34.

For example, left and right cheeks 58, 60 run along the elongated hole 34, where the rectangular plates 44, 46 are each guided between the two cheeks 58, 60 if the mounting pin 36 is in the floating position 56. The rectangular plates 44, 46 can then move freely back and forth along the guide region 62 bounded by the two cheeks 58, 60.

The locking regions 38, 40 are formed in the two cheeks 58, 60 in the form of cutouts 64, 66, which are complementary to an outer contour of the rectangular plates 44, 46. The outer contours of the rectangular plates 44, 46 projecting into the cutouts 64, 66 of the cheeks 58, 60 block a movement of the mounting pin 36 and thus of the lower link arm 12 along the elongated hole 34 in the operating or the transport position 52, 54.

For a visual status check, the two locking regions 38, 40 are oriented differently. In FIG. 2, the two locking regions 38, 40 may be disposed at an angle of approximately 45° relative to one another.

The rectangular plates 44, 46 are designed or dimensioned in such a way that they form an overload safety device for protecting the upper locking region 40 on the lift spindle 16 when the lower link arm 12 is fixed in the transport position 54 by the mounting pin 36. If, in this state, an implement is suspended in the lower link arm 12 and raised by the hydraulic lift mechanism, the overloading of the rectangular plates 44, 46, will cause the latter to be bent out of the respective locking region 38, 40, with release of the lower link arm 12. Under the effect of the implement load, the lower link arm 12 will pivot in the direction of the operating position 52 until the mounting pin 36 comes into contact with the lower end of the elongated hole 34 and the lower link arm 12 assumes a stable state.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A three-point hitch for an agricultural tractor, comprising:
   a lift arm;
   a lower link arm;
   a lift spindle disposed between the lift arm and the lower link arm for transmitting a pivoting movement performed on the lift arm to the lower link arm, wherein the lift spindle comprises a first fastening section articulated on the lift arm and a second fastening section articulated on the lower link arm;
   an elongated hole formed in the second fastening section along a longitudinal direction of the lift spindle;
   a first cheek that has a first length and extends along a first side of the elongated hole;
   a second cheek that has a second length and extends along a second side of the elongated hole, where the first length is different from the second length, and the first side of the elongated hole is opposite the second side of the elongated hole;
   a mounting pin extending through a fastening opening in the lower link arm and mounted in the elongated hole; and
   at least two locking regions spaced apart from one another and formed along the elongated hole for receiving a shaped feature provided on the mounting pin;
   wherein the at least two locking regions use the first and second cheeks, and the at least two locking regions are oriented differently from one another;
   wherein, movement of the lower link arm along the elongated hole is blocked when the shaped feature of the mounting pin is received by one of the locking regions.

2. The three-point hitch of claim 1, wherein the shaped feature is movable into a floating position for releasing the lower link arm along the elongated hole by reversing the mounting pin.

3. The three-point hitch of claim 2, wherein the shaped feature is guided between the two cheeks in the floating position.

4. The three-point hitch of claim 2, wherein a first locking region of the at least two locking regions is formed by a first cutout in the first cheek with a first slope and a second cutout in the second cheek with a second slope, where the first and second slopes are different, and the first cutout and the second cutout are configured to receive different sides of an outer contour of the shaped feature.

5. The three-point hitch of claim 4, wherein the mounting pin includes an end face, and the shaped feature comprises a rectangular plate disposed on the end face of the mounting pin.

6. The three-point hitch of claim 5, wherein the first cutout is configured to receive a first side of the rectangular plate and the second cutout is configured to receive a second side of the rectangular plate, where the second side of the rectangular plate is adjacent to the first side of the rectangular plate.

7. The three-point hitch of claim 1, wherein the at least two locking regions comprise a first locking region and a second locking region; and
   wherein the first locking region is configured to lock the shaped feature of the mounting pin in a first orientation, and the second locking region is configured to lock the shaped feature of the mounting pin in a second orientation, where the first and second orientations of the shaped feature of the mounting pin are at an angle of approximately 45° relative to one another.

8. The three-point hitch of claim 1, wherein the second fastening section comprises two fork segments engaging the lower link arm.

9. The three-point hitch of claim 8, wherein the at least two locking regions are provided on each of the two fork segments.

10. The three-point hitch of claim 1, wherein the elongated hole comprises a length of about 80 mm.

11. An agricultural machine, comprising:
   a three-point hitch for coupling to an implement, the three-point hitch comprising:
      a lift arm;
      a lower link arm;
      a lift spindle disposed between the lift arm and the lower link arm for transmitting a pivoting movement performed on the lift arm to the lower link arm, wherein the lift spindle comprises a first fastening section articulated on the lift arm and a second fastening section articulated on the lower link arm;
      an elongated hole formed in the second fastening section along a longitudinal direction of the lift spindle;
      a first cheek that has a first length and extends along a first side of the elongated hole;
      a second cheek that has a second length and extends along a second side of the elongated hole, where the first length is different from the second length, and the first side of the elongated hole is opposite the second side of the elongated hole;
      a mounting pin extending through a fastening opening in the lower link arm and mounted in the elongated hole; and at least two locking regions spaced apart from one another and formed along the elongated hole for receiving a shaped feature provided on the mounting pin;

wherein the at least two locking regions use the first and second cheeks, and the at least two locking regions are oriented differently from one another;

wherein, movement of the lower link arm along the elongated hole is blocked when the shaped feature of the mounting pin is received by one of the locking regions.

12. The agricultural machine of claim 11, wherein the shaped feature is movable into a floating position for releasing the lower link arm along the elongated hole by reversing the mounting pin.

13. The agricultural machine of claim 12, wherein the shaped feature is guided between the first and second cheeks in the floating position.

14. The agricultural machine of claim 13, wherein the at least two locking regions are formed in the first and second cheeks as cutouts corresponding to an outer contour of the shaped feature.

15. The agricultural machine of claim 13, wherein the mounting pin includes an end face, and the shaped feature comprises a rectangular plate disposed on the end face of the mounting pin.

16. The agricultural machine of claim 15, wherein the rectangular plate is removably coupled to the mounting pin.

17. The agricultural machine of claim 11, wherein the second fastening section comprises at least two fork segments engaging the lower link arm, the at least two locking regions being located on each of the at least two fork segments.

18. The agricultural machine of claim 11, wherein the at least two locking regions are positioned at an angle of approximately 45° relative to one another.

19. An agricultural machine assembly, comprising:
a implement; and
a three-point hitch removably coupled to the implement, the three-point hitch comprising:
a lift arm;
a lower link arm;
a lift spindle disposed between the lift arm and the lower link arm for transmitting a pivoting movement performed on the lift arm to the lower link arm, wherein the lift spindle comprises a first fastening section articulated on the lift arm and a second fastening section articulated on the lower link arm;
an elongated hole formed in the second fastening section along a longitudinal direction of the lift spindle;
a first cheek that has a first length and extends along a first side of the elongated hole;
a second cheek that has a second length and extends along a second side of the elongated hole, where the first length is different from the second length, and the first side of the elongated hole is opposite the second side of the elongated hole;
a mounting pin extending through a fastening opening in the lower link arm and mounted in the elongated hole; and
at least two locking regions spaced apart from one another and formed along the elongated hole for receiving a shaped feature provided on the mounting pin;
wherein the at least two locking regions use the first and second cheeks;
wherein the at least two locking regions comprise a first locking region and a second locking region where the first locking region is configured to lock the shaped feature of the mounting pin in a first orientation, and the second locking region is configured to lock the shaped feature of the mounting pin in a second orientation, where the first and second orientations of the shaped feature of the mounting pin are at an angle of approximately 45° relative to one another;
wherein, movement of the lower link arm along the elongated hole is blocked when the shaped feature of the mounting pin is received by one of the locking regions.

* * * * *